July 10, 1951  R. E. KESEL ET AL  2,559,880
FILM MEASURING AND DOUBLE-EXPOSURE PREVENTION DEVICE
Filed Sept. 30, 1949
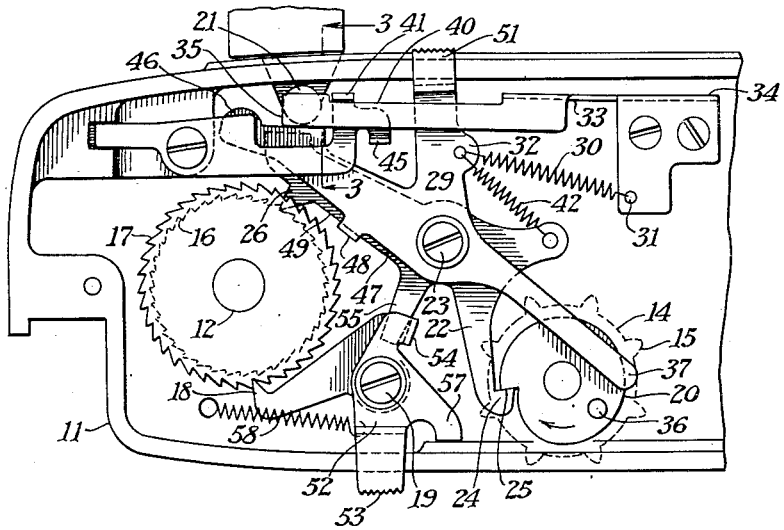
FIG. 1.
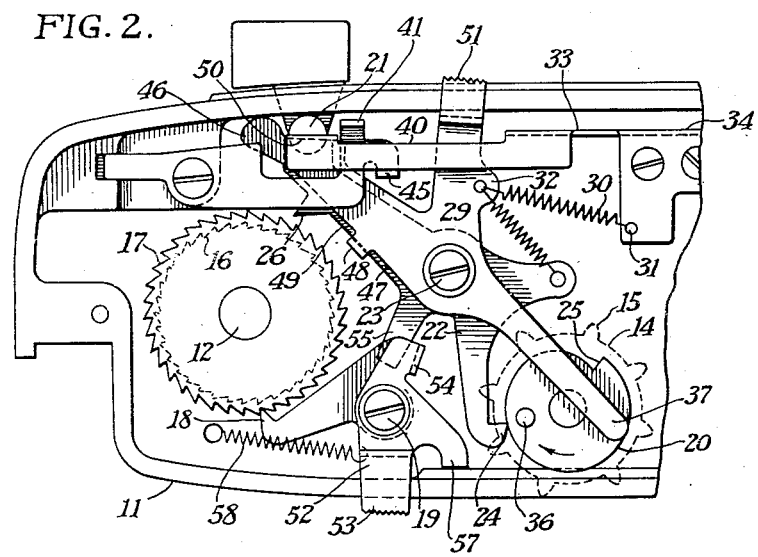
FIG. 2.
FIG. 3.  FIG. 4.
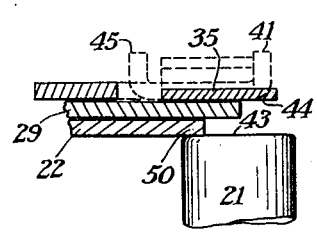
FIG. 5.
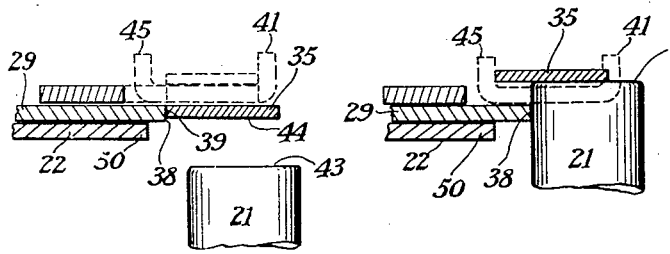
ROBERT E. KESEL
ROBERT F. BLATTNER
INVENTORS
BY
ATTORNEYS Patented July 10, 1951

2,559,880

UNITED STATES PATENT OFFICE 2,559,880

FILM MEASURING AND DOUBLE-EXPOSURE PREVENTION DEVICE

Robert E. Kesel and Robert F. Blattner, Rochester, N. Y., assignors to Eastman Kodak Company, Rochester, N. Y., a corporation of New Jersey Application September 30, 1949, Serial No. 118,902

10 Claims. (Cl. 95—31)

The present invention relates to cameras, and more particularly to a combination metering and double-exposure prevention mechanism.

One object of the invention is the provision of a camera with a film-winding or measuring mechanism and a shutter-actuating mechanism which are so interconnected that the mechanisms can normally be operated only in one sequence so as to prevent thereby the winding of an unexposed film area or the making of a double exposure on the same film frame.

Another object of the present invention is the provision of mechanisms of the class described, both of which are controlled positively in timed relation to the film movement so as to insure accurate operation.

Still another object of the invention is the provision of mechanisms of the type which are automatic and positive in their operation, accurate, and highly effective in use.

To these and other ends, the invention resides in certain improvements and combinations of parts, all as would be hereinafter more fully described, the novel features being pointed out in the claims at the end of the specification.

In the drawings:

Fig. 1 is a plan view of a combination film metering and double exposure prevention device constructed in accordance with the preferred embodiment of the present invention, showing the parts at the end of the film winding operation, with parts in cocked relation and with the film measuring mechanism locked and the shutter released for operation;

Fig. 2 is a view similar to Fig. 1, but with the parts in the position after the shutter operation and in which the parts are positioned to unlock the film winding mechanism and to lock the shutter against a second actuation;

Fig. 3 is a partial sectional view through a portion of the mechanisms illustrated in Figs. 1 and 2, showing the relation of the double-lever arrangement when the parts are cocked, as shown in Fig. 1;

Fig. 4 is a view similar to Fig. 3, but showing the shutter plunger in position to release the holding means of the cocked lever; and Fig. 5 is a view similar to Figs. 3 and 4, showing the position of the parts after the shutter operation, illustrating the position of the levers to prevent a second movement of the shutter plunger.

Similar references, numerous throughout the various views, indicate the same parts.

The drawings show a camera body 11 in which is mounted for rotation a take-up spindle 12 on which exposed film is adapted to be wound after each exposure, as is well known. A film measuring roll is positioned just ahead of the spindle 12 and carries a sprocket 14, the teeth 15 of which engage in perforations of a film strip so that movement of the latter serves to rotate the roll and sprocket in definite and positive timed relation with the film movement. The number of teeth 15 is such that the roll makes a single revolution each time an image area is moved into position. The spindle 12 has mounted thereon a ratchet 16 which cooperates with a locking member to be later described. The second ratchet 17 is also mounted on the spindle 12 and is engaged by a pawl 18 pivoted at 19 on the camera body to prevent clock springing of the spindle when the latter is released. The structure so far described may be of any suitable design and does not per se constitute a part of the present invention.

A cam disk 20 is mounted directly on the measuring roll above sprocket 14 so as to rotate as a unit therewith. Like the roll, the cam 20 makes exactly one revolution as the film strip is advanced the distance of one frame, the advantages of which are apparent from the following description. A plunger 21 is directly connected to the shutter trip mechanism (not shown) in such a manner that the vertical or sliding movement of the plunger will serve to actuate or trip the shutter. As such a shutter mechanism forms no part of the present invention, it is not shown or illustrated.

The film measuring or metering mechanism comprised a lever 22 pivoted at 23 on the camera body. One end (right end as viewed in the drawings) is provided with a claw 24 adapted to ride on the surface of the cam 20. Means, to be later described, is yieldably connected to the lever 22 and tends to rotate or rock the latter in a counterclockwise direction so as always to maintain claw 24 in engagement with the periphery of cam 20. When the latter has been rotated exactly one revolution to move the film the distance of one frame, the claw 24 registers with and drops into the recess 25 formed in the periphery of the cam 20. Such movement enables the lever 22 to rock in a counterclockwise direction about its pivot 23 to bring a pawl 26, on the left end of the lever 22, into locking or holding relation with the ratchet 16 to arrest further rotation of the spindle to prevent additional movement of the film strip. Thus, when the film strip has been moved the proper distance (1 frame), the parts are locked automatically and effective to stop further film movement.

It is desirable to correlate the film movement or metering mechanism with the shutter operating mechanism so that both mechanisms are interconnected to operate normally only in one sequence so as to prevent either the movement of an unexposed film area or the making of a double exposure on a single film frame.

To secure this result, a second lever 29 also is pivoted at 23 so that both levers 22 and 29 are mounted for rocking movement about the common pivot 23. A coil spring 30 has one end anchored at 31 and the other end connected to a lateral extension 32 of lever 29 and tends to move or rock the latter in a clockwise direction about pivot 23, as is apparent from inspection of Figs. 1 and 2. A laterally displaceable cantilever stop spring 33 has an end 34 anchored to the camera case or body while the free end 35 is positionable above and in the path of the shutter plunger 21, shown in Fig. 1. When the cam 20 is rotated, by the moving film, a cocking pin 36 thereon engages an extension 37 of lever 29 and serves to rock the latter in a counterclockwise direction from the position shown in Fig. 2 to the position shown in Fig. 1.

In its latter position, the spring 30 is tensioned, and the lever 29 may be considered as cocked. Also when the lever 29 reaches its cocked position, the free end 35 of the stop spring 33 finally drops down behind the lever 29 and in the path of the plunger 21 as shown in Fig. 1. As the cam 20 continues its rotation, the cocking pin 36 finally moves out of engagement with extension 37 and the latter, under the action of the cocked or tensioned spring 30, rocks slightly in a clockwise direction to bring an edge 38 of lever 29 into engagement with an edge 39 of the end 35 of stop spring 33, as best shown in Fig. 3. Stop spring 33 thus serves to retain lever 29 in this cocked position. Such engagement flexes the stop spring 33 laterally or sideways sufficiently to bring edge 40 thereof into engagement with a fixed stop 41 which limits such sideward movement of the spring 33 to retain the lever 29 in its cocked relation and to position the stop spring 33 in the path of the plunger 21 as illustrated in Fig. 1. Thus, at the end of the winding operation the parts are in the position shown in Fig. 1 with the pawl 26 in engagement with the ratchet 16 to lock the film winding mechanism, and with the lever 29 in its cocked relation with the stop spring 33 overlying and in the path of the plunger 21.

As mentioned above, means is provided for holding the retaining claw 24 in engagement with the periphery of cam 20. This means may be in the form of a spring connected directly to lever 22 and having an end anchored. However, in order to secure proper balance with spring 30, it is preferred to connect levers 22 and 29 yieldably so that as the latter is rocked in a counterclockwise direction, the claw 24 would be held yieldably in contact with cam 20 so as to drop into the recess 25 when the latter registers with claw. To this end, a coil spring 42 has the opposite ends connected to levers 22 and 29, as shown in Figs. 1 and 2, so that both levers will be rocked in a counterclockwise direction under the action of the cocking pin 36 to tension spring 42 which serves to retain claw 24 in contact with cam 20, as is apparent.

With the parts in the position shown in Figs. 1 and 3, the plunger 21 is free to be moved to actuate the shutter. Such plunger movement, which is upward as viewed in Fig. 3, serves to bring the upper end 43 of the plunger 21 against the underside 44 of the free end 35 of the stop spring 33. Further upward movement of the plunger then lifts the spring 33 out of holding relation with the edge 38 of lever 29, the plunger then sliding along edge 38 as illustrated in Fig. 4. When the end 35 of spring 33 is clear of lever 29, it snaps or flexes thereover or to the left, as viewed in Fig. 4, to overlie the lever, the edge 39 of spring 33 engaging a second fixed stop 45 to limit the movement of the spring and to position the latter. The parts are then in the position shown in Fig. 4 so that, after the shutter is actuated, the plunger 21 is returned by means (not shown) to its original position shown in Fig. 3, and out of contact with lever 29 to free the latter. The freed lever 29 now rocks in a clockwise direction, under the action of its tensioned or cocked spring 30, until an end 46 of the lever finally engages the camera body to limit further movement of lever 29, as shown in Fig. 2. The clockwise movement of lever 29 is utilized to move the lever 22 simultaneously and as a unit therewith to shift pawl 26 out of locking or holding relation with ratchet 16. To secure this result, edge 47 of lever 29 is provided with a laterally extending and downturned lug 48 which engages the edge 49 of lever 22 so that both levers turn clockwise as a unit. Thus, the cam 20 serves both to move the lever 22 into a locking relation with ratchet 16 and to cock the lever 29. The spring 30, on the other hand, serves to rock both the levers 22 and 29 to release the film mechanism after the shutter has been actuated.

In order that the shutter may not be actuated a second time before moving the film to bring an unexposed image area into position, it is necessary to provide means to block plunger 21 after the shutter has been once operated. As described above, after the plunger 21 is moved to actuate the shutter, the levers 22 and 29 are rocked in a clockwise direction. The lever 29 may be moved a distance sufficient to be positioned in the path of, and to overlie the plunger 21, as shown in Fig. 5, to prevent a second actuation thereof. However, from the above description, it will be apparent that the cocking pin 36 will engage the lever 29 to rock the latter to its cocked position before the recess 25 of cam 20 is moved into register with the pawl 24. The result is that the shutter may be freed shortly before the exposed film frame has been completely wound so that it is possible for the shutter to be actuated to cause a double exposure on at least part of the image frame.

In order to eliminate this possibility, it is preferred to shape the upper or left end 50 of lever 22 so that the latter, rather than lever 29, acts to block the plunger 21 after the shutter has been actuated. With this arrangement, the blocking end 50 will not be moved out of the path of the plunger 21 until the film is completely wound and the recess 25 is moved into register with the pawl 24. The result is that the shutter cannot be actuated until the film winding operation has been completed, the advantages of which are deemed apparent.

The above-described structure is, therefore, effective in preventing the winding of an unexposed film area or the second actuation of the shutter to make an unintentional double exposure. However, it may be desirable in some cases to make a deliberate and intentional double exposure. To secure this result, the lever 29 is formed with a projection 51 which extends through the camera body to the exterior thereof. By moving the projection 51 to the left, a counterclockwise rotation will be imparted manually to lever 29 to cock the latter and rotate it in the position shown in Fig. 1 independent of cam 20 and the movement of the film strip. Such movement of the lever 29 serves to tension spring 42 to cause lever 22 also to rock in a counterclockwise direction to move the end 50 thereof out of blocking relation with the plunger 21 to permit a second actuation of the shutter. Upon such actuation, an intentional double exposure may be made, after which the parts are then in the position shown in Fig. 2 to lock the shutter and to free the film winding mechanism so that the frame bearing the double exposure may be wound onto the spindle 12.

In order to permit rewinding of the film, it is necessary to release both the holding pawl 26 from ratchet 16 and the clock spring pawl 18 from ratchet 17. In order to secure this dual disengagement, the pawl 18 is formed with a laterally extending arm 52 which projects through the camera body and terminates in a finger piece 53. The pawl 18 also has formed thereon a downturned lug or ear 54 which is positioned in the path of a projecting finger 55 formed on lever 22. It will be apparent from the drawings that a rightward movement of finger piece 53 will impart a counterclockwise movement to pawl 18 about its pivot 19 to disconnect the pawl from ratchet 17. Further clockwise movement will bring lug 54 into engagement with finger 55 to rock lever 22 in a clockwise direction about pivot 23 to disconnect pawl 26 from ratchet 16 to free spindle 12 to permit reverse rotation thereof for winding up the exposed film. A coil spring 58 has one end anchored to the camera body and the other end connected to arm 53 to retain the pawl 18 in contact with ratchet 16 except when released by the movement of the finger piece 53. A stop 57 limits the movement of pawl 18 by spring 58 to position the pawl to engage ratchet 16.

The device of the present invention provides a new combination of film metering and double exposure prevention mechanisms which prevent effectively and automatically the winding of an unexposed film area or frame or the making of an unintentional double exposure, yet it permits ready and easy adjustment of the parts to enable a deliberate double exposure to be made when desired. The mechanisms are automatic, positive, and accurate.

While one embodiment of the invention has been disclosed, it is to be understood that the inventive idea may be carried out in a number of ways. This application is, therefore, not to be limited to the precise details described but is intended to cover all modifications falling within the scope of the appended claims.

We claim:

1. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, at least one of said levers having a portion thereof positionable in the path of said plunger, means controlled by said measuring roll for rocking one of said levers in one direction and into engagement with said ratchet to lock said spindle after a predetermined length of film has been moved, spring means tending to move the second lever in the opposite direction, means for moving said second lever in said one direction and against the action of its spring to cock said second lever, displaceable means for holding said second lever in its cocked position, said last mentioned means when in its holding position being positioned in the path of said plunger so as to be engaged and displaced by said plunger and moved out of contact with said second lever when said plunger is actuated to free said second lever, said spring then serving to rock said second lever in the opposite direction, and means for moving said first lever in said opposite direction and out of locking relation with said spindle to free the spindle, the movement of said levers in said opposite direction serving to position said portion in the path of said plunger to prevent actuation thereof until the film is moved.

2. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged and rotated when said film is moved, a movable shutter plunger mounted for reciprocation on said body, of a pair of levers mounted on said body for rocking movement about a common pivot, at least one of said levers having a portion thereof positionable in the path of said plunger, means controlled by said measuring roll for rocking one of said levers in one direction and into engagement with said ratchet to lock said spindle after a predetermined length of film has been moved, spring means tending to move the second lever in the opposite direction, means controlled by said roll for moving said second lever in said one direction and against the action of said spring to cock said second lever, displaceable means for holding said second lever in its cocked position, said last mentioned means when in its holding position being positioned in the path of said plunger so as to be engaged and displaced by said plunger and moved out of contact with said second lever when said plunger is actuated to free said second lever, said spring then serving to rock said second lever in the opposite direction, and means for moving said first lever in said opposite direction and out of locking relation with said spindle to free the spindle, the movement of said levers in said opposite direction serving to position said portion in the path of said plunger to prevent actuation thereof until the film is moved.

3. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged and rotated when said film is moved, a movable shutter plunger mounted for reciprocation on said body, of a pair of levers mounted on said body for rocking movement about a common pivot, at least one of said levers having a portion thereof positionable in the path of said plunger, means controlled by said measuring roll for rocking one of said levers in one direction and into engagement with said ratchet to lock said spindle after a predetermined length of film has been moved, spring means tending to move the second lever in the opposite direction, means controlled by said roll for moving said second lever in said one direction against the action of its spring to cock said second lever, a yieldable member positioned in said path and engaged by said second lever to hold the latter out of said path and in its cocked relation, said member being engaged by said plunger upon the actuation thereof to move said member out of holding relation with said second lever to free the latter, means to position said member, said spring serving to move said freed second lever in said opposite direction, and means controlled by the last movement of said second lever for moving said portion into said path to prevent operation of said plunger and simultaneously to move said first lever out of locking arrangement with said ratchet to free said spindle.

4. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, at least one of said levers having a portion thereof positionable in the path of said plunger, means controlled by said measuring roll for rocking one of said levers in one direction and into engagement with said ratchet to lock said spindle after a predetermined length of film has been moved, spring means tending to move the second lever in the opposite direction, means controlled by said roll for moving said second lever in said one direction against the action of its spring to cock said second lever, a yieldable member positioned in said path and engaged by said second lever to hold the latter out of said path and in its cocked relation, said member being engaged by said plunger upon the actuation thereof to move said member out of holding relation with said second lever to free the latter, means to position said member, said spring serving to move said freed second lever in said opposite direction, and means operatively connecting said first lever to said second lever so that movement of the latter in said opposite direction will serve to move said first lever out of locking relation with said ratchet to free said spindle and simultaneously position said portion in said path to prevent movement of said plunger for actuating said shutter.

5. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, at least one of said levers having a portion thereof positionable in the path of said plunger, means controlled by said measuring roll for rocking one of said levers in one direction and into engagement with said ratchet to lock said spindle after a predetermined length of film has been moved, spring means tending to move the second lever in the opposite direction, means controlled by said roll for moving said second lever in said one direction against the action of its spring to cock said second lever, a stop spring carried by said body and positioned in the path of said plunger, said stop spring engaging and holding said second lever to retain the latter in its cocked relation, the actuation of said plunger serving to move said stop spring out of holding relation to free said second lever which now moves in said opposite direction under the action of its spring, said stop spring then snapping over said second lever and out of said path, means for limiting the movement of said stop spring in either of its positions, and yieldable means connecting said levers so as to move said first lever in said opposite direction as a unit with said second lever to disconnect the first lever from holding relation with said ratchet to free said spindle and simultaneously to move said portion into said path to prevent further actuation of said plunger.

6. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, at least one of said levers having a portion thereof positionable in the path of said plunger, a cam carried by said roll and engaging one end of said one lever to rock the latter in one direction about its pivot to move the opposite end of said one lever into locking relation with said ratchet to arrest further movement of said spindle, a stop spring carried by said body and positionable in said path, spring means tending to rock said second lever in another direction so as to position one end of said second lever in underlying relation with said stop spring, a cocking pin carried by said cam and adapted to engage the other end of said second lever to move the latter against the action of its spring from underneath said stop spring to permit the latter to drop behind said second lever and into said path to hold said second lever out of said path and to cock said second lever, means to retain said stop spring in said path so as to be engaged by said plunger upon actuation thereof, said engagement serving to lift said stop spring out of holding relation with said second lever and to move said stop spring over said second lever, means to limit the movement of said stop spring to position the latter relative to said path, said spring means serving to rock said freed second lever in said one direction, and auxiliary spring means connecting said levers to move the first lever as a unit with said second lever in said opposite direction to disengage said opposite end of said first lever from said ratchet to free said spindle and simultaneously to move said portion into said path to block further movement of said plunger to prevent actuation of said shutter.

7. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, at least one of said levers having a portion thereof positionable in the path of said plunger, a cam carried by said measuring roll and engaging one end of one of said levers for moving the other end of said one lever in one direction and into locking relation with said ratchet to arrest movement of said spindle after a predetermined length of film has been moved, spring means tending to rock the other lever in another direction, means associated with said measuring roll for rocking said other lever in the one direction to cock said other lever, a displaceable member for retaining said other lever in its cocked position, resilient means connecting said levers to retain said one end of said one lever in engagement with said cam, said member being engaged and moved from its holding position by and upon movement of said plunger to actuate said shutter to free said second lever, the latter then rocking in the opposite direction under the action of its spring, and means for moving said one lever in said opposite direction with said other lever to disengage said one lever from said ratchet and simultaneously to position said portion in said path to block further movement of said plunger.

8. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, at least one of said levers having a portion thereof positionable in the path of said plunger, a cam carried by said measuring roll and engaging one end of one of said levers for moving the other end of said one lever into locking relation with said ratchet to arrest movement of said spindle after a predetermined length of film has been moved, spring means tending to rock the other lever in one direction, means associated with said measuring roll for rocking said other lever in the opposite direction to cock said other lever, a displaceable member for retaining said other lever in its cocked position, resilient means connecting said levers to retain said one end of said one lever in engagement with said cam, said member being engaged and moved from its holding position upon movement of said plunger to actuate said shutter to free said second lever, the latter then rocking in the opposite direction under the action of its spring, and a lug on said other lever engaging said one lever to connect said levers for unitary movement in said opposite direction to disengage said one end from said ratchet to free said spindle and simultaneously to move said portion into said path to block said plunger against movement.

9. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, at least one of said levers having a portion thereof positionable in the path of said plunger, a cam carried by said measuring roll and engaging one end of one of said levers for moving the other end of said one lever into locking relation with said ratchet to arrest movement of said spindle after a predetermined length of film has been moved, spring means tending to rock the other lever in one direction, means associated with said measuring roll for rocking said other lever in the opposite direction against the action of said spring to cock said other lever, a displaceable member for retaining said other lever in its cocked position, means for positioning said member, spring means connecting said levers and tending to rock said one lever in said one direction to retain said one end thereof in engagement with said cam, said member being lifted out of holding relation by movement of said plunger and snapping over said other lever to free the latter, means for limiting movement of said member to position the latter, said freed lever moving in said opposite direction under the action of its spring to slide under said member, and a lug on said other lever engaging said one lever to connect said levers for unitary rocking movement in said one direction to move said other end of said one lever out of locking relation with said ratchet to free said spindle and to move said portion into said path to block movement of said plunger.

10. In a roll-film camera, the combination with a camera body having a winding mechanism mounted thereon and including a winding spindle for winding up the film and moving the latter across said camera, a ratchet carried by said spindle, a film-measuring roll mounted on said body so as to be engaged by and rotated when said film is moved, a movable shutter plunger mounted for reciprocation on said body, of a pair of levers mounted on said body for rocking movement about a common pivot, a cam carried by said measuring roll and engaging one end of one of said levers and rocking said one lever in one direction about its pivot to move the other end of said one lever into locking relation with said ratchet to arrest further movement of said spindle and film, a coil spring connected to said second lever and tending to rock the latter in the opposite direction about its pivot, a cocking pin on said cam engaging said second lever to rock the latter in said one direction about its pivot and against the action of said spring to cock said second lever, a second coil spring connecting said lever to retain said one end of said one lever in engagement with said cam, a flexible displaceable stop spring carried by said body and positioned to drop down behind said cocked lever and in the path of said plunger to hold said second lever in its cocked relation, stop means for limiting the movement of said stop spring to position the latter, the movement of said plunger to actuate said shutter serving to engage and lift said stop spring out of holding relation to free said cocked lever, the stop spring then flexing over said second lever, stop means to limit the movement of said stop spring to position the latter, said freed second lever then rocking in said other direction under the action of said first coil spring, a lug on said second lever engaging said first lever to connect said levers for unitary movement in said opposite direction to rock said first lever in said opposite direction to disengage said other end from said ratchet to free said spindle, and a portion on said one lever moving into said path upon movement of said one lever in said other direction to block said plunger to prevent further movement thereof until the film is again moved and the ratchet locked.

ROBERT E. KESEL
ROBERT F. BLATTNER.

No references cited.